United States Patent
Kojima et al.

(10) Patent No.: US 7,150,705 B2
(45) Date of Patent: Dec. 19, 2006

(54) TOOL CHANGING DEVICE WHICH PREVENTS CHIPS ADHERING TO TOOL

(75) Inventors: Kunio Kojima, Yamanashi (JP); Naoki Sato, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 291 days.

(21) Appl. No.: 10/792,792

(22) Filed: Mar. 5, 2004

(65) Prior Publication Data

US 2004/0176228 A1  Sep. 9, 2004

(30) Foreign Application Priority Data

Mar. 6, 2003  (JP) .............................. 2003-060428

(51) Int. Cl.
  *B23Q 3/157*  (2006.01)
  *B23Q 11/00*  (2006.01)
(52) U.S. Cl. .................. 483/1; 483/2; 483/13; 483/66; 483/69; 483/39; 483/41
(58) Field of Classification Search ................ 483/1, 483/2, 13, 66–68, 69, 39, 41; 409/137; 408/67–68; 82/901
  See application file for complete search history.

(56) References Cited

U.S. PATENT DOCUMENTS

| | | | |
|---|---|---|---|
| 3,691,655 A | * | 9/1972 | Kurimoto et al. .............. 483/7 |
| 3,789,501 A | * | 2/1974 | Kurimoto et al. ............. 483/41 |
| 3,932,924 A | * | 1/1976 | Anderson ........................ 483/1 |
| 4,610,074 A | * | 9/1986 | Katsube et al. ............... 483/54 |
| 5,424,621 A | * | 6/1995 | Hwang et al. ................. 483/44 |
| 5,674,169 A | * | 10/1997 | Yang ........................... 483/32 |
| 5,735,029 A | * | 4/1998 | Panetta ........................ 483/31 |
| 6,090,026 A | * | 7/2000 | Hosokawa et al. ........... 483/39 |

FOREIGN PATENT DOCUMENTS

| | | | |
|---|---|---|---|
| EP | 0 855 245 A1 | | 7/1998 |
| JP | 5-077129 A | * | 3/1993 |
| JP | 11-042527 A | * | 2/1999 |
| JP | 2004-338036 A | * | 12/2004 |

OTHER PUBLICATIONS

Patent Abstracts of Japan of Japanese Publication No. 08174372 published Jul. 9, 1996.
Patent Abstracts of Japan Japanese Publication No. 2002273640 published Sep. 25, 2002.

* cited by examiner

*Primary Examiner*—Erica Cadugan
(74) *Attorney, Agent, or Firm*—Staas & Halsey LLP

(57) ABSTRACT

A tool changing device of a machine tool which prevents chips adhering to a tool. By using a drive motor with which a tool changing device of the machine tool is usually provided, to vibrate the tool, the chips are prevented from adhering to the tool, especially to a tapered portion of the tool, and/or the chips adhered to the tool are removed, without using any additional device.

12 Claims, 5 Drawing Sheets

TOOL CHANGING DEVICE WHICH PREVENTS CHIPS ADHERING TO TOOL

BACKGROUND OF THE INVENTION

1. Field of the Invention

The present invention relates to a tool changing device of a machine tool.

2. Description of the Related Art

In a machine tool, in order to improve forming accuracy and extend the lifetime of a tool, a coolant liquid is supplied to a cutting point of a workpiece being cut by the tool. Moreover, in order to prevent cuttings or chips of the workpiece from scattering, the cutting point may be covered by coolant sprayed as a curtain.

In such a machine tool, the chips may be scattered with the coolant and may adhere, with the coolant, to some parts of the machine tool during processing. If the chips adhere to a tapered portion of the tool, it may be difficult to exchange the tool with another tool, and the forming accuracy may deteriorate after the tool is changed.

Therefore, Japanese Patent Publication (Kokai) No. 2002-273640 discloses a cleaning device, for a machine tool, which can remove chips adhered to a tapered portion of a tool by jetting a coolant liquid during changing the tool.

Also, Japanese Patent Publication (Kokai) No. 8-174372 discloses a chip removing device having a vibrator for vibrating a chip cover, in order to remove chips deposited on a chip cover arranged to prevent the chips or a dust adhering to a sliding surface of a machine tool and/or a shaft drive member.

The proposed devices for removing the chips have a problem that a coolant supplying unit or a mechanism such as a vibrator for removing the chips must be installed, additionally, on the machine tool.

Also, in the above Japanese Patent Publication (Kokai) No. 2002-273640, it is proposed that an air mixing means for mixing an air flow with a coolant liquid should be used, in order to resolve a problem that, when the viscosity of the coolant is relatively high, the jet force of the coolant is reduced and is not sufficient for cleaning the tapered portion of the tool. Therefore, the air mixing means must be newly installed, as well as the coolant supplying unit, in order to remove the chips adhered to the tapered portion of the tool.

On the other hand, the device disclosed in the above Japanese Patent Publication (Kokai) No. 8-174372 can remove the chips or the dust deposited on the chip cover by the vibrator positioned on the opposite side of the chip cover in relation to a cutting area. Therefore, the device cannot remove the chips adhered to the tapered portion of the tool.

SUMMARY OF THE INVENTION

It is an object of the present invention to resolve above-mentioned problem in prior art, and to prevent cuttings or chips from adhering to a tool of a machine tool without using any additional device.

In accordance with the present invention, by using a drive motor with which a tool changing device of the machine tool is usually provided, in order to vibrate the tool, the chips are prevented from adhering to the tool, e.g., a tapered portion of the tool, and/or the chips adhered to the tool are removed, without using any additional device.

The invention may be performed as an aspect of a method for preventing chips from adhering and an aspect of a tool changing device.

The method for preventing chips from adhering according to the invention can be performed as a first embodiment applied to a tool magazine and a second embodiment applied to a tool changing arm.

In accordance with the first embodiment of the method of the present invention, there is provided a method for preventing chips adhering to a tool held in a tool magazine of a tool changing device of a machine tool, the tool changing device comprising a tool magazine drive motor for indexing the tool magazine, the method comprising; holding the tool in the tool magazine; and vibratory driving of the tool magazine drive motor to vibrate the tool magazine in order to vibrate the tool.

The vibratory driving of the tool magazine drive motor may be performed during a non-machining period of the machine tool. Further, the vibratory driving of the tool magazine drive motor can be performed by the motor such that the motor performs a forward and a reverse rotation alternately in a certain cycle or the motor performs a rotation and a pause alternately in a certain cycle.

In accordance with the second embodiment of the method of the present invention, there is provided a method for preventing chips adhering to a tool held by a tool changing arm of a tool changing device of a machine tool, the tool changing device comprising a tool changing arm drive motor for rotating the tool changing arm, the method comprising; holding the tool by the tool changing arm; and vibratory driving of the tool changing arm drive motor to vibrate the tool changing arm in order to vibrate the tool.

The vibratory driving of the tool changing arm drive motor is performed during a non-machining period of the machine tool. Further, the vibratory driving of the tool changing arm drive motor can be performed such that the motor performs a forward and a reverse rotation alternately in a certain cycle or the motor performs a rotation and a pause alternately in a certain cycle.

The tool changing device according to the invention also can be performed as a first embodiment applied to a tool magazine and a second embodiment applied to a tool changing arm.

In accordance with the first embodiment of the tool changing device of the present invention, there is provided a tool changing device of a machine tool comprising; a tool magazine; a tool magazine drive motor for indexing the tool magazine; and a tool magazine control for controlling driving of the tool magazine drive motor; the tool magazine control can control driving of the motor such that the motor performs a forward and a reverse rotation alternately or performs a rotation and a pause alternately in a certain cycle so as to vibrate the tool magazine.

The tool magazine control can control the driving of the motor during a non-machining period of the machine tool.

In accordance with the second embodiment of the tool changing device of the present invention, there is provided a tool changing device of a machine tool comprising; a tool changing arm; a tool changing arm drive motor for rotating the tool changing arm; and a tool changing arm control for controlling driving of the tool changing arm drive motor; the tool changing arm control can control driving of the motor such that the motor performs a forward and a reverse rotation alternately in a certain cycle or performs a rotation and a pause alternately so as to vibrate the tool changing arm.

The tool changing arm control can control the driving of the motor during a non-machining period of the machine tool.

BRIEF DESCRIPTION OF THE DRAWING

The above and other objects, features and advantages of the present invention will be made more apparent from the following description of the preferred embodiments thereof with reference to the accompanying drawings, wherein.

DETAILED DESCRIPTION

In the following, embodiments of the invention will be described with reference to the drawings.

Figure 1:
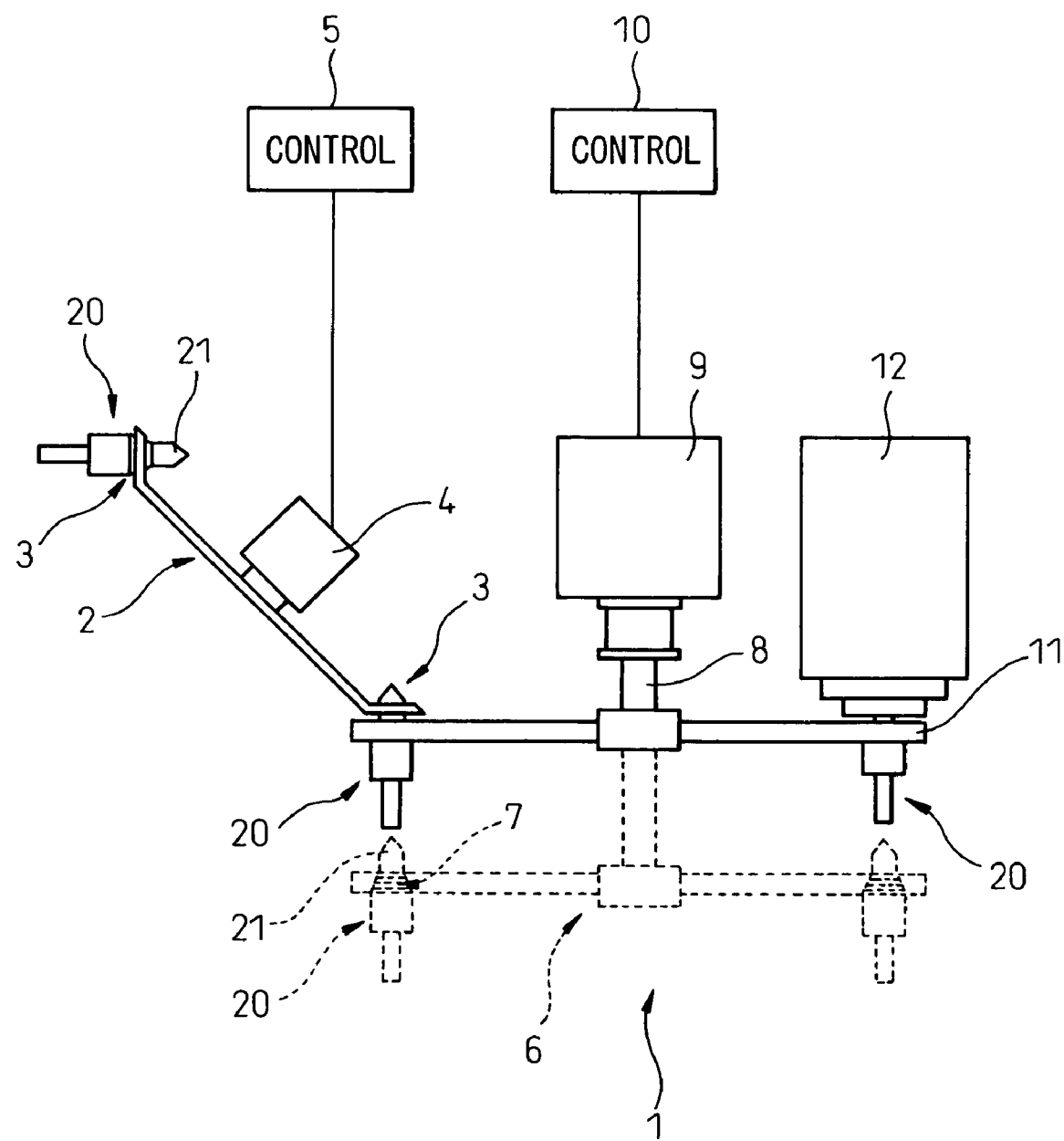
FIG. 1 shows a scheme for explaining an embodiment of the present invention.

FIG. 1 shows a scheme for explaining a tool changing device of the invention. In addition, the construction of a machine tool is omitted in FIG. 1.

Referring to the FIG. 1, a machine tool performs machining, such as cutting, by mounting a selected tool 20 on a machining spindle 11 and driving the spindle 11 by a machining drive 12. The mounting of the tool 20 on the spindle 11 is performed through a tapered portion 21 arranged on the tool 20. This tool driving system for the tool 20 depicted in FIG. 1 is merely an example and, therefore, the system may use other configuration.

A tool changing device 1 includes a tool magazine 2 holding a plurality of tools 20, and a tool changing arm 6. The tool changing device 1 takes out a tool suitable for a object to be machined or a machining manner, from among the plurality of tools 20 held in the tool magazine 2, and replace a tool attached to the spindle 11 with the selected tool using the changing arm 6.

Figure 2:
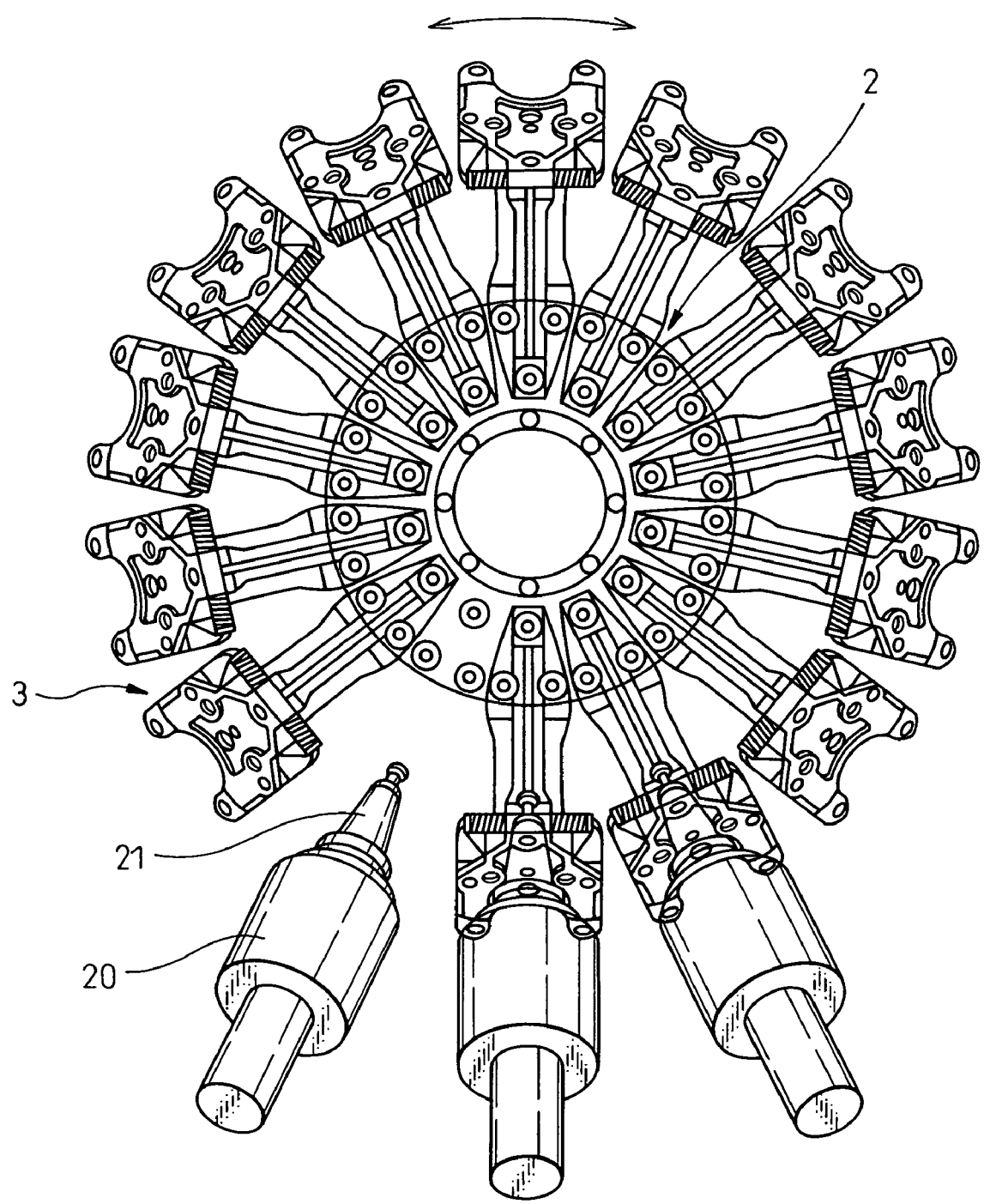
FIG. 2 is a schematic top view of an example of a tool magazine.
Figure 3:
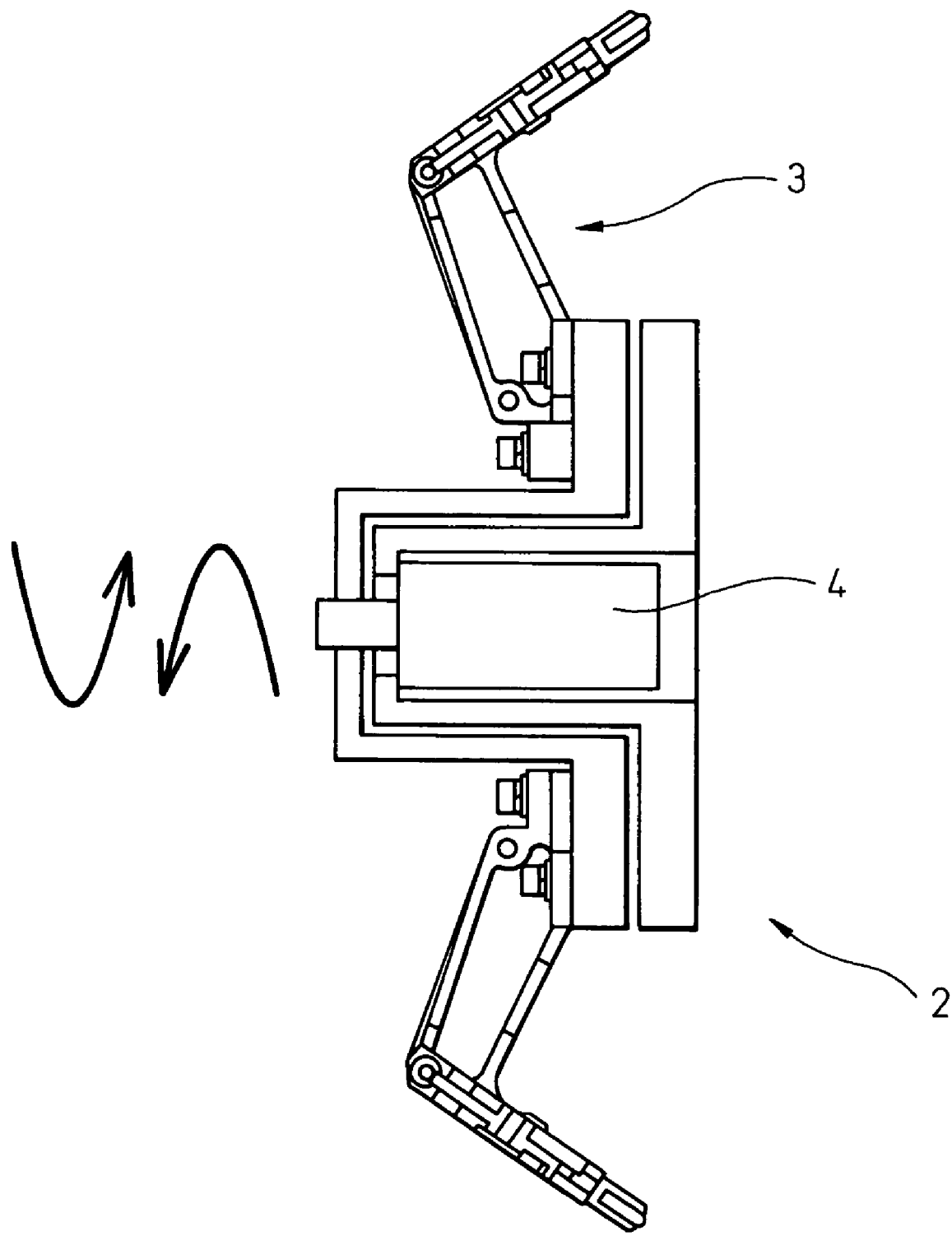
FIG. 3 is a schematic side cross-sectional view of the tool magazine.

FIGS. 2 and 3 are a schematic top view and a side cross-sectional view of the tool magazine 2, respectively. The tool magazine 2 includes a plurality of holding parts 3 on a periphery of a circle, the center of which is coincide with a rotation axis of the magazine 2. The rotation axis is rotatable by a tool magazine drive motor 4, whereby indexing the magazine 2 to a desired rotational position can be performed. The indexing of the tool magazine 2 means determining the rotational position of the magazine 2 so as to the selected tool can be received by the changing arm 6. The indexing can be performed by controlling the rotational position of the tool magazine drive motor 4.

Figure 4:
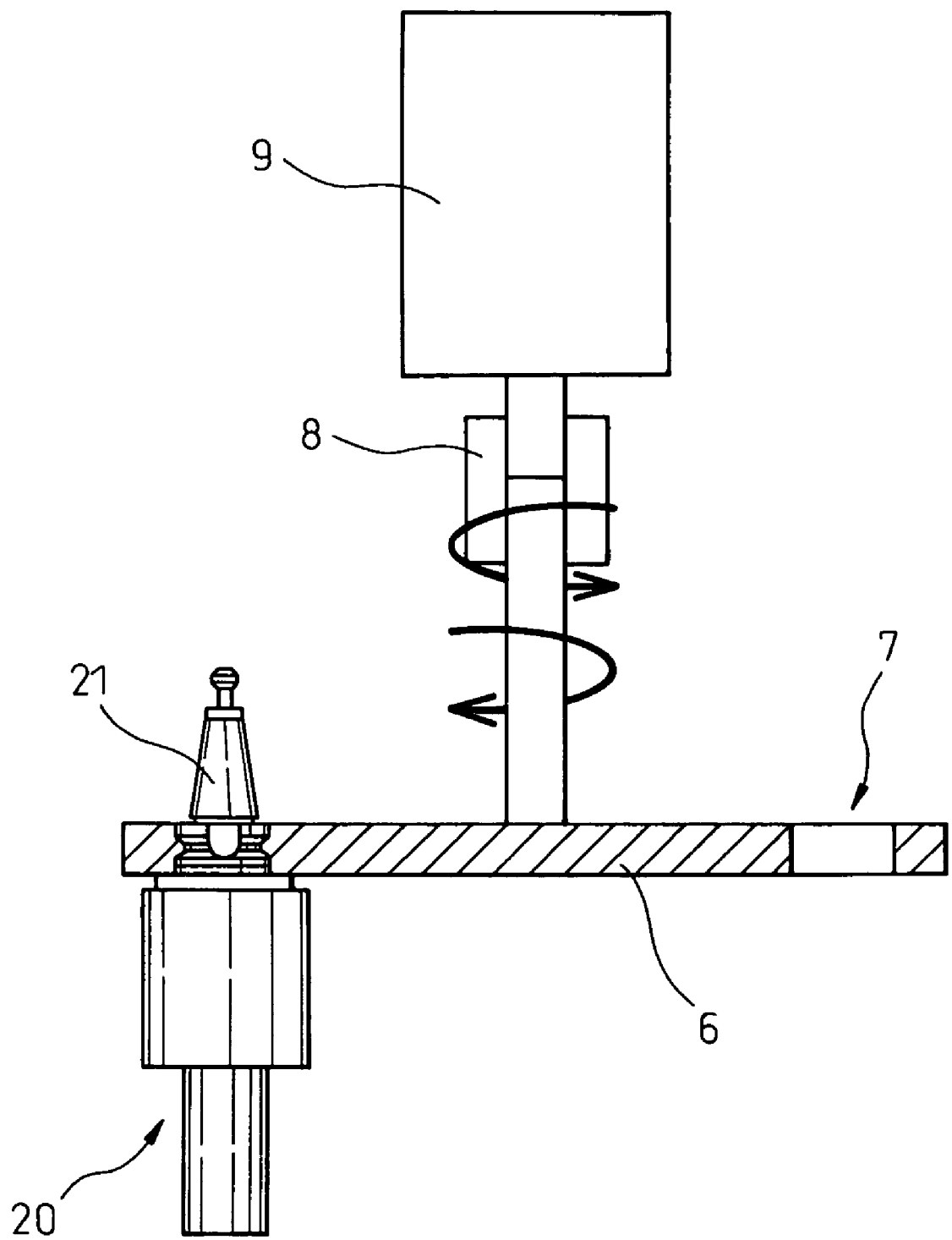
FIG. 4 is a schematic side cross-sectional view of an example of a tool changing arm.

FIG. 4 is a schematic side cross-sectional view of the tool changing arm 6. As the changing arm 6 is connected to a revolving shaft 8 rotatable by a tool changing arm drive motor 9, the changing arm 6 may stop at a desired rotational position. By controlling the tool changing arm drive motor 9 so as to determine the rotational position of the shaft 8, a tool gripping part 7 arranged on the changing arm 6 can be positioned to a position aligned with the tool magazine 2 or the spindle 11.

The operation of the tool magazine drive motor 4 is controlled by a tool magazine control 5, and the operation of the tool changing arm drive motor 9 is controlled by a tool magazine control 10.

In the tool changing device 1, in order to select a tool 20 suitable for machining and to mount the tool 20 on the spindle 11, the tool magazine 2 is rotated to a rotational position where the selected tool 20 can be received by the changing arm 6. The tool changing arm 6 is also rotated by the tool changing arm drive motor 9 via the revolving shaft 8 so that the gripping part 7 of the arm 6 is aligned with a changing position.

In this changing position, the tool 20 held by the holding part 3 of the tool magazine 2 is gripped by the gripping part 7, then the revolving shaft 8 is rotated so as to move the tool 20 gripped by the gripping part 7 to a position aligned with the spindle 11. Now the spindle 11 can receive the tool 20 from the gripping part 7 of the arm 6. Thus, the tool selected from the tool magazine 2 can be mounted on the spindle 11.

On the other hand, in order to return the tool 20 mounted on the spindle 11 to the tool magazine 2, the gripping part 7 of the changing arm 6 is displaced so as to be aligned with the tool 20 mounted on the spindle 11, then the tool 20 mounted on the spindle 11 is moved to the gripping part 7 of the changing arm 6. Next, the tool changing arm 6 is also rotated by the tool changing arm drive motor 9 via the revolving shaft 8 so that the gripping part 7 gripping the tool 20 is displaced to a changing position aligned with the tool magazine 2. The tool magazine 2 is also rotated by the tool changing arm drive motor 4 so that a vacant holding part 3 is aligned with a changing position.

Next, in the changing point, the tool 20 gripped by the gripping part 7 of the arm 6 is moved to the vacant holding part 3 of the magazine 2. Thus, the tool 20 can be returned to the tool magazine 2.

In the tool changing device 1 of the invention, the tool magazine control 5 controls the operation of the tool magazine drive motor 4 and performs conventional indexing for determining the rotational position of the tool magazine 2, as described above. Moreover, the tool magazine control 5 can perform a motion control for removing chips adhered to the tapered portion 21 of the tool 20 and/or preventing chips from adhering to the tapered portion 21.

The prevention of adhering and/or the removing of the chips against the tapered portion 21 can be achieved by vibrating the tool magazine 2 by driving the tool magazine drive motor 4. This vibration of the magazine 2 can be achieved, for example, by driving the tool magazine drive motor 4 such that the motor performs a forward and a reverse rotation alternately in a certain cycle or performs a rotation and a pause alternately in a certain cycle. The rotation-pause operation of the motor 4 can be performed by the rotation in only one direction and the pause alternately, or by the rotation in one direction and the pause alternately in a certain period and by the rotation in another direction and the pause alternately in a certain period.

Figure 5:
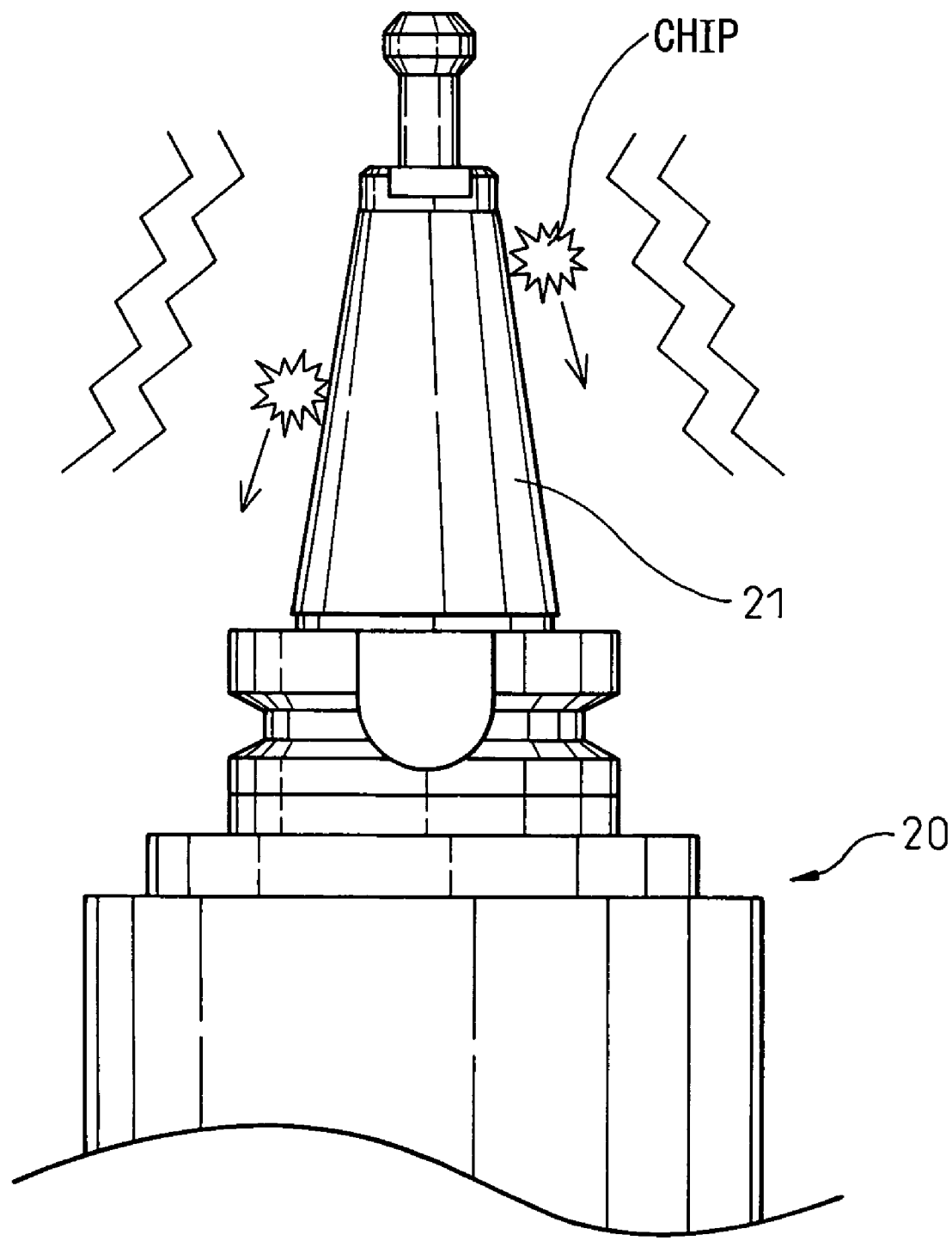
FIG. 5 is a schematic view illustrating a condition in which chips are prevented from adhering to a tapered portion of the tool and/or chips adhered to the tapered portion are removed.

By the forward-reverse rotating operation and/or the rotation-pause operation of the tool magazine drive motor 4, a certain level of vibration is applied to the tool magazine 2, which is not achieved by a constant rotational motion. By this vibration, chips adhered to the tool 20, especially to the tapered portion 21 of the tool 20, are shaken and removed from the tool, and/or chips are prevented from adhering to the tapered portion 21. FIG. 5 shows a condition in which chips are prevented from adhering to the tapered portion of the tool and/or chips adhered to the tapered portion are removed.

Also, in the tool changing device 1 of the invention, the tool changing arm control 10 controls the operation of the tool changing arm drive motor 9 and controls a conventional revolving motion determining the rotational position of the tool changing arm 6, as described above. Moreover, the tool changing arm control 10 can perform a motion control for removing chips adhered to the tapered portion 21 of the tool 20 and/or preventing chips from adhering to the tapered portion 21.

The prevention of adhering and/or the removing of the chips against the tapered portion 21 can be achieved by vibrating the tool changing arm 6 by driving the tool changing arm drive motor 9. This vibration of the arm 6 can be achieved, for example, by driving the tool changing arm drive motor 9 such that the motor performs a forward and a reverse rotation alternately in a certain cycle or performs a rotation and a pause alternately in a certain cycle. The rotation-pause operation of the motor 9 can be performed by the rotation in only one direction and the pause alternately, or by the rotation in one direction and the pause alternately in a certain period and by the rotation in another direction and the pause alternately in a certain period.

By the forward-reverse rotating operation and/or the rotation-pause operation of the tool changing arm drive motor 9, a certain level of vibration is applied to the tool changing arm 6, which is not achieved by a constant rotational motion. By this vibration, chips adhered to the tool 20, especially to the tapered portion 21 of the tool 20, is shaken and removed from the tool, and/or chips are prevented from adhering to the tapered portion 21.

The vibration can be performed whenever the drive motor 4 or 9 can be vibratory driven, e.g., when the tool magazine drive motor 4 is not performing a usual indexing motion, or the tool changing arm drive motor 9 is not performing a usual revolving motion. Further, the vibration can be performed at regular intervals or for a certain period determined by a program command. For example, the vibration can be applied to the tool for a certain period in order to remove chips adhered to the tool, or for a period as long as possible in order to prevent chips from adhering to the tool.

However, if the vibration is performed during machining, the forming accuracy of the machine tool may deteriorate. Therefore, the vibration is preferably applied to the tool during a non-machining period of the machine tool, e.g., for the tool magazine, while the machine tool is waiting for machining or is rapid-traversing the tool or the workpiece and, for the tool changing arm, while the machine tool is waiting for machining or changing the tool. In such a manner, adverse effects regarding machining motion such a deterioration of the forming accuracy are prevented.

In the following, an example of programming will be described for vibratory driving the tool magazine drive motor and/or the tool changing arm drive motor by program command, as shown below:

G00 Xaaa Yaaa Zaaa Mxxx;
Myyy;
G01Xmmm;
Mxxx Pzzz;
M06Tnnn;

A code Mxxx is a M-code for starting the vibration, a code Myyy is a M-code for stopping the vibration and a code Pzzz is a code for setting a vibration time.

The vibration is started with a rapid-traversing of the tool or the workpiece, by a block "G00 Xaaa Yaaa Zaaa Mxxx". The vibration started by the start command "Mxxx" is stopped by the stop command "Myyy". After the tool or the workpiece is fed by the cutting feed command "G01Xmmm", the vibration is started by another start command "Mxxx". The vibration is continued for a period of time set by the command "Pzzz", and is stopped after the period of time passes. After the vibration is stopped, the tool is changed by a tool changing command "M06Tnnn". In addition, by the above M-codes for starting and stopping the vibration, the tool magazine drive motor and/or the tool changing arm drive motor may be controlled.

As described above, the chips adhered to the tapered portion of the tool of the machine tool can be removed without using any additional device.

While the invention has been described with reference to specific embodiments chosen for the purpose of illustration, it should be apparent that numerous modification could be made thereto by those skilled in the art without departing from the basic concept and scope of the invention.

The invention claimed is:

1. A method for preventing chips adhering to a tool held in a tool magazine of a tool changing device of a machine tool, the tool changing device comprising a tool magazine drive motor for indexing the tool magazine, the method comprising:
   holding the tool in the tool magazine; and
   vibratory driving of the tool magazine drive motor, by a driving motion of the tool magazine drive motor which is not included in a tool changing indexing motion of the tool magazine drive motor, to vibrate the tool magazine in order to vibrate the tool during at least a part of a non-machining period of the machine tool.

2. A method as set forth in claim 1, wherein the vibratory driving of the tool magazine drive motor comprises driving the motor such that the motor performs a forward and a reverse rotation alternately in a certain cycle.

3. A method as set forth in claim 1, wherein the vibratory driving of the tool magazine drive motor comprises driving the motor such that the motor performs a rotation and a pause alternately in a certain cycle.

4. A method for preventing chips adhering to a tool held by a tool changing arm of a tool changing device of a machine tool, the tool changing device comprising a tool changing arm drive motor for rotating the tool changing arm, the method comprising:
   holding the tool by the tool changing arm; and
   vibratory driving of the tool changing arm drive motor, by a driving motion of the tool changing arm drive motor which is not included in a changing rotating motion of the tool changing arm drive motor, to vibrate the tool changing arm in order to vibrate the tool during at least a part of a non-machining period of the machine tool.

5. A method as set forth in claim 4, wherein the vibratory driving of the tool changing arm drive motor comprises driving the motor such that the motor performs a forward and a reverse rotation alternately in a certain cycle.

6. A method as set forth in claim 4, wherein the vibratory driving of the tool changing arm drive motor comprises driving the motor such that the motor performs a rotation and a pause alternately In a certain cycle.

7. A tool changing device of a machine tool comprising:
   a tool magazine;
   a tool magazine drive motor for indexing the tool magazine; and
   a tool magazine control for controlling driving of the tool magazine drive motor;
   wherein the tool magazine control controls driving of the tool magazine drive motor, by a driving motion of the tool magazine drive motor which is not included in a tool changing indexing motion of the tool magazine drive motor, such that the motor is vibratory driven so as to vibrate the tool magazine during at least a part of a non-machining period of the machine tool.

8. A tool changing device as set forth in claim 7, wherein the tool magazine control controls the driving of the motor such that the motor performs a forward and a reverse rotation alternately in a certain cycle.

9. A tool changing device as set forth in claim 7, wherein the tool magazine control controls the driving of the motor such that the motor performs a rotation and a pause alternately in a certain cycle.

10. A tool changing device of a machine tool comprising:
   a tool changing arm;
   a tool changing arm drive motor for rotating the tool changing arm; and
   a tool changing arm control for controlling driving of the tool changing arm drive motor;
   wherein the tool changing arm control controls driving of the tool changing arm drive motor, by a driving motion of the tool changing arm drive motor which is not included in a tool changing arm rotating motion of the tool changing arm drive motor, such that the motor is vibratory driven so as to vibrate the tool changing arm during at least a part of a non-machining period of the machine tool.

11. A tool changing device as set forth in claim 10, wherein the tool changing arm control controls the driving of the motor such that the motor performs a forward and a reverse rotation alternately in a certain cycle.

12. A tool changing device as set forth in claim 10, wherein the tool changing arm control controls the driving of the motor such that the motor performs a rotation and a pause alternately in a certain cycle.

* * * * *

UNITED STATES PATENT AND TRADEMARK OFFICE
CERTIFICATE OF CORRECTION

| | | |
|---|---|---|
| PATENT NO. | : 7,150,705 B2 | Page 1 of 1 |
| APPLICATION NO. | : 10/792792 | |
| DATED | : December 19, 2006 | |
| INVENTOR(S) | : Kunio Kojima | |

It is certified that error appears in the above-identified patent and that said Letters Patent is hereby corrected as shown below:

Column 6, Line 42, after "in a" insert --tool--.

Column 6, Line 54, change "In" to --in--.

Signed and Sealed this

Nineteenth Day of June, 2007

JON W. DUDAS
*Director of the United States Patent and Trademark Office*